Feb. 2, 1932.     W. R. COLLINGS     1,843,761
METHOD OF SEPARATING CALCIUM CHLORIDE AND MAGNESIUM
CHLORIDE FROM MIXED SOLUTIONS THEREOF
Original Filed Sept. 6, 1928
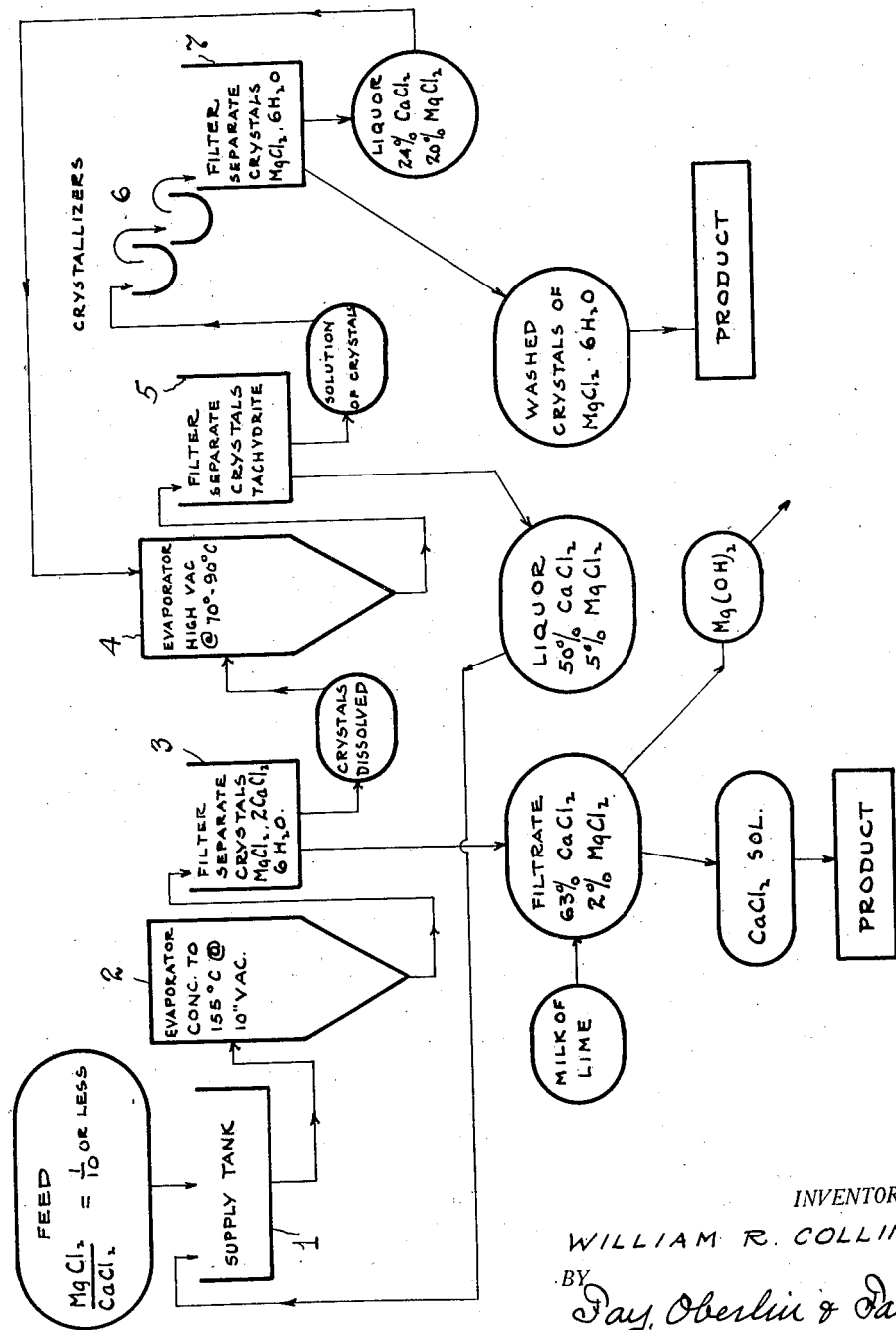
INVENTOR.
WILLIAM R. COLLINGS
BY
Fay, Oberlin & Fay
ATTORNEYS.

Patented Feb. 2, 1932

1,843,761

UNITED STATES PATENT OFFICE

WILLIAM R. COLLINGS, OF MIDLAND, MICHIGAN, ASSIGNOR TO THE DOW CHEMICAL COMPANY, OF MIDLAND, MICHIGAN, A CORPORATION OF MICHIGAN

METHOD OF SEPARATING CALCIUM CHLORIDE AND MAGNESIUM CHLORIDE FROM MIXED SOLUTIONS THEREOF

Application filed September 6, 1928, Serial No. 304,338. Renewed December 31, 1930.

In U. S. Letters Patent No. 1,627,068 to A. K. Smith and C. F. Prutton, dated May 3, 1927, there is disclosed an improved method or process for treating brines which contain calcium and magnesium chlorides with the object of separating such chlorides from each other. Incidentally to such process the calcium and magnesium chlorides, at least in part, are crystallized out of the solution in the form of a double salt known as tachydrite ($CaCl_2.2MgCl_2.12H_2O$). These crystals are then separated from the mother liquor and by appropriate treatment the calcium chloride content may be separated from the magnesium chloride and the latter purified. An improved procedure for treating such tachydrite crystals is further disclosed in a pending application of the present inventor, Serial No. 250,822, filed January 31, 1928.

As typical of a brine or mixed solution of calcium chloride and magnesium chloride, for the treatment of which the aforesaid patented process is adapted, reference is made in said patent to so-called Midland brine which, after removal of the sodium chloride and minor impurities, has approximately a composition of 11 per cent. Magnesium chloride and 33 per cent. calcium chloride, i. e., in a ratio of one to three. The ratio of these two chlorides to each other is, of course, approximately the same in the raw brine and the procedure prescribed in the patent for treatment of the brines of the character described is stated to be particularly applicable to any brine wherein the weight of magnesium chloride is not less than 9.5 per cent of the weight of the calcium chloride present in the brine, both figured as anhydrous salts.

As just stated, therefore, the process disclosed in the aforementioned patent is adapted to the treatment of brines containing magnesium chloride and calcium chloride in which the minimum proportion of the former to the latter is approximately in the ratio of one to ten. On the other hand it has been found that the upper limit of the range within which the process can be effectively employed is represented by a ratio of magnesium chloride to calcium chloride of approximately one and one half to one.

It has now been discovered that certain modifications may be advantageously made in the sequence of the several steps described and claimed in the aforesaid Letters Patent and pending application when it is desired to separate magnesium chloride from calcium chloride in solutions containing the two salts in ratios by weight substantially different from those referred to above. The present improved method or process accordingly has as its object to provide for the effective separation of such chlorides from a solution or brine in which they are originally present in a ratio by weight of one part or less of magnesium chloride ($MgCl_2$) to ten parts of calcium chloride ($CaCl_2$).

To the accomplishment of the foregoing and related ends, the invention, then, consists of the steps hereinafter fully described and particularly pointed out in the claims, the annexed drawing and the following description illustrating and setting forth in detail certain steps embodying the invention, such disclosed means constituting, however, but several of the ways in which the principle of the invention may be used.

In said annexed drawing the single figure there appearing is a diagrammatic representation on the order of a flow sheet illustrating the apparatus and steps employed in carrying out the present improved process.

So far as the present process is concerned, it is of course a matter of indifference from what source or in what manner the solution of magnesium and calcium chlorides employed therein is derived. It will be understood, therefore, that when a natural brine or bittern or a solution containing sodium chloride, in addition to the magnesium and calcium chlorides, is employed the sodium chloride will be first salted out by well known methods of concentration.

When an aqueous solution of magnesium and calcium chlorides, in which the latter is present in large excess, is sufficiently concentrated by evaporation under partial vacuum at temperatures up to about 155° C. a hydrated double chloride having the composition MgCl₂.2CaCl₂.6H₂O is crystallized out. As evaporation is continued the formation of such crystals proceeds until the magnesium chloride content of the solution is reduced to about 2 per cent. After that point is reached crystals of calcium chloride dihydrate, CaCl₂.2H₂O, begin to appear along with the double chloride crystals, and the concentration is not advantageously carried further. If, after removal of the double chloride crystals, complete separation of the remaining magnesium chloride content of the liquor is desired, this is accomplished by precipitating same as magnesium hydroxide by treating such liquor, preferably after diluting to about 45° Bé., with milk of lime and filtering off the precipitate. The filtrate remaining consists of a substantially pure solution of calcium chloride, which may be finished by the usual means.

The crystals of double chloride, MgCl₂.2CaCl₂.6H₂O, may be dissolved in water and processed for the separate recovery of magnesium and calcium chlorides according to the method of the aforementioned patent, whereby the solution thereof is evaporated in vacuo at a temperature below 100° C. to precipitate crystals of tachydrite, CaCl₂.2MgCl₂.12H₂O, which are thereupon further treated to segregate magnesium chloride hexahydrate crystals from a residual solution containing the calcium chloride.

According to the present process, the solution containing the magnesium and calcium chlorides after preliminary treatment, if any be required, is received in a supply tank 1, from which it is withdrawn as required to an evaporator 2 wherein it is concentrated to a gravity of approximately 52° Bé. or any other gravity which may be convenient for this operation. If the original solution is relatively dilute, it may be advantageous to evaporate in multiple effect rather than single effect in this step. The 52° Bé. or equivalent liquor is thereupon further concentrated, either in the same evaporator 2 or, if more convenient from an operating standpoint, in a separate evaporator not shown, the operation being conducted under partial vacuum, e. g., approximately 10 inches mercury column, until a temperature of 155° C. is reached. If a somewhat higher vacuum is employed the final temperature in this step will be slightly lower (e. g., at 12 inch vacuum the temperature is about 152° C.), and conversely if a lower vacuum is employed the finishing temperature will be correspondingly increased (e. g., at 8 inch vacuum the temperature is about 157° C.). The contents of the evaporator are then transferred to a filter tank 3 where the crystals are separated from the residual liquor. The latter, containing approximately 63 per cent. calcium chloride and 2 per cent. magnesium chloride may be finished as such to a solid product, or it may be diluted to gravity of 45° Bé., treated with milk of lime, filtered to remove the magnesium hydroxide and the clear solution of calcium chloride free from magnesium chloride finished in the usual way.

The crystals are washed and then dissolved in situ in a sufficient quantity of water to give a solution of approximately 40° Bé., and such solution pumped to an evaporator 4 wherein it is evaporated at a high vacuum, i. e., within one to two inches of barometer, at a temperature up to 90° C. By this operation crystals of tachydrite, $$CaCl_2.2MgCl_2.12H_2O$$

are produced, leaving a mother liquor containing a higher proportion of calcium to magnesium chlorides than the solution supplied to the evaporator. The mixture of such crystals and mother liquor is discharged to a filter tank 5 and separated, the mother liquor containing approximately 50% CaCl₂ and 5% MgCl₂ being returned to supply tank 1, or to evaporator 2 as most convenient. The tachydrite crystals are washed and dissolved in a limited amount of water with application of heat by blowing with steam, the resulting solution being raised to a temperature of approximately 100° C. The total amount of water added is regulated by cooling a sample to 30° C., filtering off the crystals thus formed, and measuring the gravity of the filtrate which should be 42.5° to 43.0° Bé. The hot solution is thereupon conducted to one or more crystallizers 6 wherein it is cooled to 30° C. with simultaneous formation of crystals of magnesium chloride hexahydrate, MgCl₂.6H₂O, which are separated in filter 7. The filtrate, containing approximately 24 per cent. CaCl₂ and 20 per cent. MgCl₂, is returned to evaporator 4. The hexahydrate crystals are washed to separate them from adhering mother liquor, and for final finishing are melted to produce a hot concentrated magnesium chloride solution and further evaporated in an open kettle to the desired water content.

It will be seen that the magnesium chloride content of the original solution, or a portion thereof, is progressively converted into the form of crystals having an increasingly larger proportion of magnesium chloride, viz:—

$$MgCl_2.2CaCl_2.6H_2O \rightarrow 2MgCl_2.CaCl_2.12H_2O \rightarrow MgCl_2.6H_2O.$$

The bulk of the calcium chloride in the original solution is removed in the filtrate separated from the first crystallization step.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a process of separating magnesium and calcium chlorides in a solution wherein said chlorides are present in the proportion of not more than one part of the former to ten parts of the latter, the steps which consist in evaporating such solution to precipitate crystals having the composition $$MgCl_2.2CaCl_2.6H_2O;$$

separating and dissolving such crystals; evaporating the so-obtained solution to precipitate crystals of tachydrite $$CaCl_2.2MgCl_2.12H_2O;$$

separating such tachydrite from the mother liquor and returning the latter to the first step; dissolving the tachydrite crystals in a limited amount of water with addition of heat; cooling to precipitate crystals of magnesium chloride hexahydrate; separating the latter and returning the residual liquor to the evaporation step wherein said tachydrite crystals are produced.

2. In a process of separating magnesium and calcium chlorides in a solution wherein said chlorides are present in the proportion of not more than one part of the former to ten parts of the latter, the steps which consist in evaporating such solution to precipitate crystals having the composition $$MgCl_2.2CaCl_2.6H_2O;$$

separating such crystals from the mother liquor containing calcium chloride; treating the latter with milk of lime and filtering from the magnesium hydroxide produced; dissolving said crystals; evaporating the so-obtained solution to precipitate crystals of tachydrite $CaCl_2.2MgCl_2.12H_2O$; separating such tachydrite from the mother liquor and returning the latter to the first step; dissolving the tachydrite crystals in a limited amount of water with addition of heat; cooling to precipitate crystals of magnesium chloride hexahydrate; separating the latter and returning the residual liquor to the evaporation step wherein said tachydrite crystals are produced.

3. The process of separating magnesium and calcium chlorides in a solution wherein said chlorides are present in the proportion of not more than one part of the former to ten parts of the latter, which comprises successively crystallizing the dissolved salts in the forms of $MgCl_2.2CaCl_2.6H_2O$, $2MgCl_2.CaCl_2.12H_2O$ and $MgCl_2.6H_2O$, respectively.

4. The process of separating magnesium and calcium chlorides in a solution wherein said chlorides are present in the proportion of not more than one part of the former to ten parts of the latter, which comprises successively crystallizing the dissolved salts in the forms of $MgCl_2.2CaCl_2.6H_2O$, $2MgCl_2.CaCl_2.12H_2O$ and $MgCl_2.6H_2O$, respectively, and separating such crystals from the accompanying residual liquor containing calcium chloride.

5. The process of separating magnesium and calcium chlorides in a solution wherein said chlorides are contained in the proportion of not more than one part of the former to ten parts of the latter, which comprises evaporating such solution under partial vacuum to a temperature of approximately 155° C., separating crystals of composition $MgCl_2.2CaCl_2.6H_2O$ thereby formed, dissolving such crystals in water, evaporating the solution under high vacuum to a temperature of approximately 90° C., separating crystals of tachydrite thereby formed from the mother liquor and returning the latter to the first step, dissolving the tachydrite crystals in a limited amount of water with heating to about 100° C., cooling the solution to about 30° C., separating crystals of $MgCl_2.6H_2O$, and returning the mother liquor to the evaporation step wherein tachydrite crystals are produced.

Signed by me this 15th day of August, 1928.

WILLIAM R. COLLINGS.